(12) United States Patent
Verre et al.

(10) Patent No.: US 7,715,605 B2
(45) Date of Patent: May 11, 2010

(54) SYSTEMS AND METHODS FOR COMPUTER AIDED DETECTION OF SPINAL CURVATURE USING IMAGES AND ANGLE MEASUREMENTS

(75) Inventors: Jeanne Verre, Boulogne-Billancourt (FR); Benjamin Odry, West New York, NJ (US); James G. Reisman, Plainsboro, NJ (US); Carol L. Novak, Newtown, PA (US)

(73) Assignee: Siemens Medical Solution USA, Inc., Malvern, PA (US)

( * ) Notice: Subject to any disclaimer, the term of this patent is extended or adjusted under 35 U.S.C. 154(b) by 933 days.

(21) Appl. No.: 11/507,383

(22) Filed: Aug. 21, 2006

(65) Prior Publication Data

US 2007/0055178 A1 Mar. 8, 2007

Related U.S. Application Data

(60) Provisional application No. 60/714,591, filed on Sep. 7, 2005.

(51) Int. Cl.
*A61B 5/103* (2006.01)
*G06K 9/00* (2006.01)

(52) U.S. Cl. .................................. 382/128; 600/594

(58) Field of Classification Search ......... 382/128–132; 600/594
See application file for complete search history.

(56) References Cited

U.S. PATENT DOCUMENTS

| | | | | |
|---|---|---|---|---|
| 6,258,047 B1 * | 7/2001 | Muramatsu | ................ | 600/594 |
| 6,418,238 B1 * | 7/2002 | Shiratani et al. | ............ | 382/133 |
| 6,728,401 B1 * | 4/2004 | Hardeberg | .................. | 382/167 |
| 6,833,844 B1 * | 12/2004 | Shiota et al. | ................ | 345/660 |
| 7,143,127 B2 * | 11/2006 | Cheng | ........................ | 708/290 |
| 7,545,901 B2 * | 6/2009 | Mistretta | ....................... | 378/4 |
| 2001/0013902 A1 * | 8/2001 | Kawabe | ..................... | 348/358 |
| 2004/0049103 A1 * | 3/2004 | McFarland et al. | ......... | 600/300 |
| 2004/0136606 A1 * | 7/2004 | Shinbata et al. | ............ | 382/274 |
| 2005/0164095 A1 * | 7/2005 | Ozawa | ......................... | 430/5 |
| 2006/0110068 A1 * | 5/2006 | Luo et al. | .................. | 382/289 |
| 2007/0035630 A1 * | 2/2007 | Lindenstruth et al. | .. | 348/208.99 |

OTHER PUBLICATIONS

Goh et al. ("A comparison of three methods for measuring thoracic kyphosis: implications for clinical studies", Society for Rheumatology).*
Sotoca et al. ("Geometric Properties of the 3D Spine Curve", F.J. Parales et al. (Eds.): IbPRIA 2003, LNCS 2652, pp. 1003-1011, 2003).*
S. Goh, R. I. Price, P. J. Leedman, K. P. Singer. "A comparison of three methods for measuring thoracic kyphosis: implications for clinical studies." 2000 British Society for Rheumatology, pp. 310-315.

* cited by examiner

*Primary Examiner*—Samir A Ahmed
*Assistant Examiner*—Amara Abdi
(74) *Attorney, Agent, or Firm*—Donald B. Paschburg; F. Chau & Associates, LLC

(57) ABSTRACT

A method for providing automatic detection of curvature of a spine and computation of specific angles in images of the spine includes automatically displaying the curvature of the spine as a line in an image of the spine, and computing at least one of a first angle or a second angle based on the line of the curvature of the spine.

27 Claims, 8 Drawing Sheets

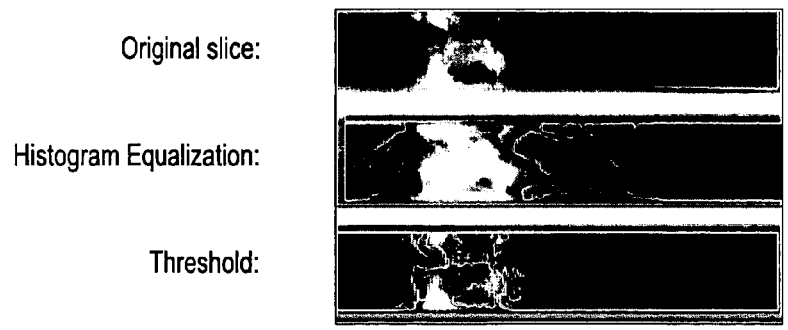
FIG. 7
    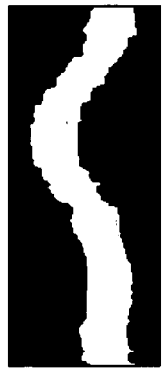
FIG. 8A  FIG. 8B  FIG. 8C  FIG. 8D  FIG. 8E
  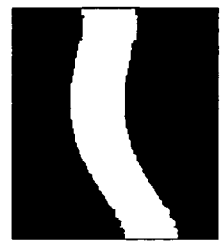
FIG. 9A  FIG. 9B  FIG. 9C

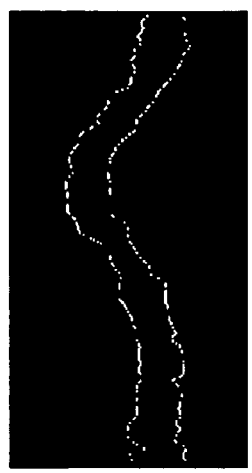
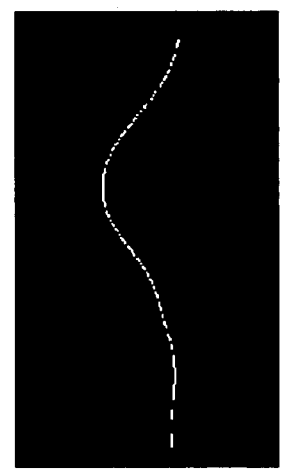
FIG. 10A     FIG. 10B     FIG. 10C
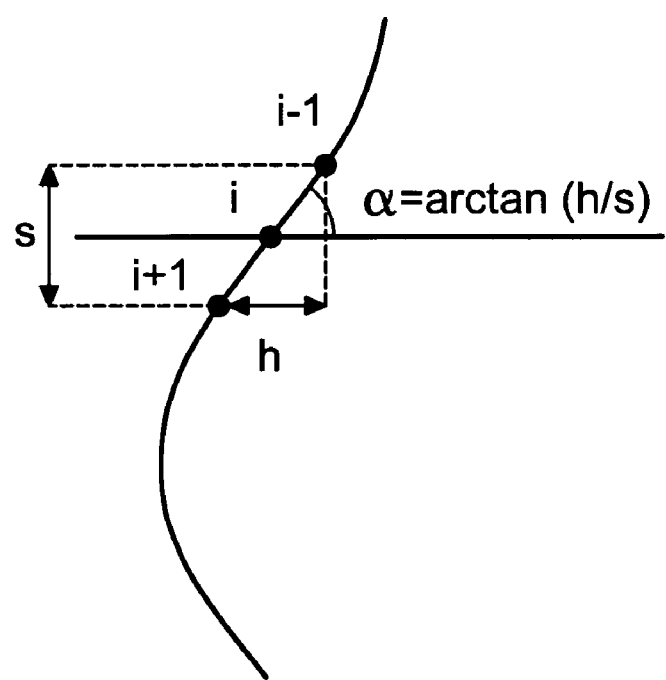
FIG. 11

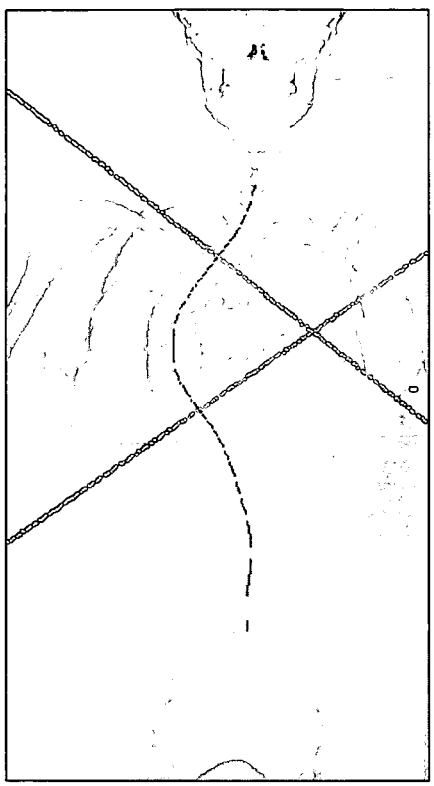 
FIG. 12A          FIG. 12B
FIG. 13

SYSTEMS AND METHODS FOR COMPUTER AIDED DETECTION OF SPINAL CURVATURE USING IMAGES AND ANGLE MEASUREMENTS

CROSS-REFERENCE TO RELATED PATENT APPLICATION

This application claims the benefit of U.S. Provisional Application Ser. No. 60/714,591, filed Sep. 7, 2005 and entitled "Detection of the Curvature of the Spine from X-Ray Images and Angle Measurements", the content of which is herein incorporated by reference in its entirety.

BACKGROUND OF THE INVENTION

1. Technical Field

The present disclosure relates to systems and methods for providing automated detection of spinal curvature and, more particularly, to systems and methods for providing automated detection of spinal curvature using images of the spine and angle measurements.

2. Discussion of Related Art

The spine is made up of twenty-four vertebrae which are separated by discs. The normal curves of the spine provide the spine with the properties of flexibility, resiliency and shock absorbency. Scoliosis is a musculoskeletal condition in which there is an abnormal lateral curvature of the spine, causing the spinal column to bend to the left or right. Various studies have defined scoliosis as a lateral deviation of the normal vertical line of the spine which, when measured by X-rays, is greater than ten degrees. Whereas a normal spine, when the body is viewed from directly behind, has the appearance of a straight line, a spine with scoliosis resembles the letter S or C, because of the abnormal curvature. Scoliosis starts when the spine does not develop its normal front to back arches, which causes unusual weight to be carried on the discs. The center of certain discs shifts to one side and the vertebra tip to the other. This misalignment, called a subluxation, causes the spine to bend to the left or right. To compensate for this bend, the spine tips to the other side at another level and the result is scoliosis.

Scoliosis can occur at any age, but most often appears in early adolescence. Screening is useful when early identification enables treatment to be started that may halt the progression of the deformity. The Scoliosis Research Society and the American Academy of Orthopaedic Surgeons have endorsed school screening programs to detect scoliosis curves before they may become advanced. To diagnose the condition, a doctor may request an X-ray to get a better view of the spine. In an X-ray image, the curve of the scoliosis is usually measured by looking at the back view of the spine and measuring the angle formed by the top and bottom vertebrae of the curve. This measurement is called the Cobb angle.

Kyphosis is a spinal deformity which can be seen in association with scoliosis. Kyphosis in the thoracic spine means exaggerated kyphotic angle from the spine's normal kyphotic curve. A spine affected by kyphosis shows evidence of a forward curvature of the vertebrae in the upper back area, which leads to a "humpback" appearance. The Scoliosis Research Society defines kyphosis as a curvature of the spine measuring forty-five degrees or greater on an X-ray. The normal spine has only about twenty to forty-five degrees of curvature in the upper back area. Kyphosis is indicated in lateral X-ray images of the spine by the kyphotic angle, which is the superior angle formed by intersection of two lines drawn on a lateral chest radiogram, tangential to the anterior borders of the second and eleventh intervertebral disc spaces.

Using current methods, the Cobb angle is calculated by hand. FIG. 1 illustrates the hand calculation of the Cobb angle in a coronal view of the spine. Referring to FIG. 1, the first step is to find the end-vertebrae which are the vertebrae at the upper and lower limits of the curve which tilt most severely toward the concavity of the curve. Once these vertebrae have been selected, a line is drawn along the upper endplate of the upper body and along the lower endplate of the lower body as shown in FIG. 1. The kyphotic angle is also determined by hand. It is defined in the same way as the Cobb angle but is calculated from lateral images. The quality of an image of the spine may be poor, making it difficult if not impossible to locate the limits of the vertebrae, such as when the image is an X-ray image of the spine.

SUMMARY OF THE INVENTION

According to an exemplary embodiment of the present invention, a method is provided for automatic detection of curvature of a spine and computation of specific angles in images of the spine. The method includes: automatically displaying the curvature of the spine as a line in an image of the spine; and computing at least one of a first angle or a second angle based on the line of the curvature of the spine.

According to an exemplary embodiment of the present invention, a system for providing automatic detection of curvature of a spine and computation of specific angles in images of the spine comprises: a memory device for storing a program; a processor in communication with the memory device, the processor operative with the program to: automatically display the curvature of the spine as a line in an image of the spine; and compute at least one of a first angle or a second angle based on the line of the curvature of the spine.

According to an exemplary embodiment of the present invention, a method for providing automatic detection of curvature of a spine and computation of one of a Cobb angle or a kyphotic angle in an X-ray image of the spine includes: automatically detecting whether the X-ray image is a lateral view of the spine or a coronal view of the spine; detecting the spine in the X-ray image of the spine; determining the curvature of the spine in the X-ray image of the spine; and when it is determined that the X-ray image is a coronal view of the spine, computing the Cobb angle, and when it is determined that the X-ray image is a lateral view of the spine, computing the kyphotic angle

BRIEF DESCRIPTION OF THE DRAWINGS

The present invention will become more apparent to those of ordinary skill in the art when descriptions of exemplary embodiments thereof are read with reference to the accompanying drawings.

FIG. 7 illustrates improving the contrast of vertebrae of the spine, according to an exemplary embodiment of the present invention.

FIGS. 8A through 8E illustrate the generation of the mask of the spine for coronal images, according to an exemplary embodiment of the present invention.

FIGS. 9A through 9C illustrate the generation of the mask of the spine for lateral images, according to an exemplary embodiment of the present invention.

FIGS. 10A through 10C show displays of the curvature of the spine, according to an exemplary embodiment of the present invention.

FIG. 11 illustrates a calculation of the angle of a point in a curve, according to an exemplary embodiment of the present invention.

FIGS. 12A and 12B illustrate curves of the spine and Cobb angle in a coronal image and a lateral image, respectively, according to exemplary embodiments of the present invention.

FIG. 13 illustrates edge detection with Gabor filter of two vertebrae of interest in a coronal image, according to an exemplary embodiment of the present invention.

DESCRIPTION OF EXEMPLARY EMBODIMENTS

Hereinafter, exemplary embodiments of the present invention will be described in detail with reference to the accompanying drawings.

Figure 2:
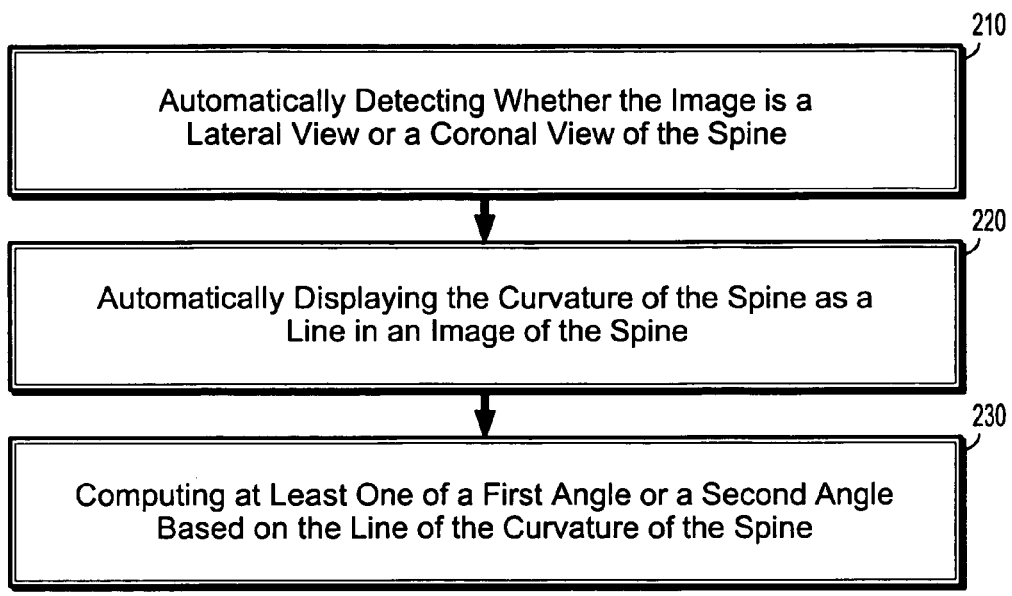
FIG. 2 is a flowchart showing a method for automatic detection of curvature of a spine and computation of specific angles in images of the spine, according to an exemplary embodiment of the present invention.

FIG. 2 is a flowchart showing a method for automatic detection of curvature of a spine and computation of specific angles in images of the spine, according to an exemplary embodiment of the present invention. Referring to FIG. 2, in an optional step 210, it is automatically determined whether the image is a first view or a second view of the spine. For example, the first view may be a lateral view of the spine, and the second view may be a coronal view of the spine. Examples of images include X-ray images, positron emission tomography (PET) images, computed tomography (CT) images, magnetic resonance imaging (MRI) images, single-photon emission computed tomography (SPECT) images, etc.

Figure 3:
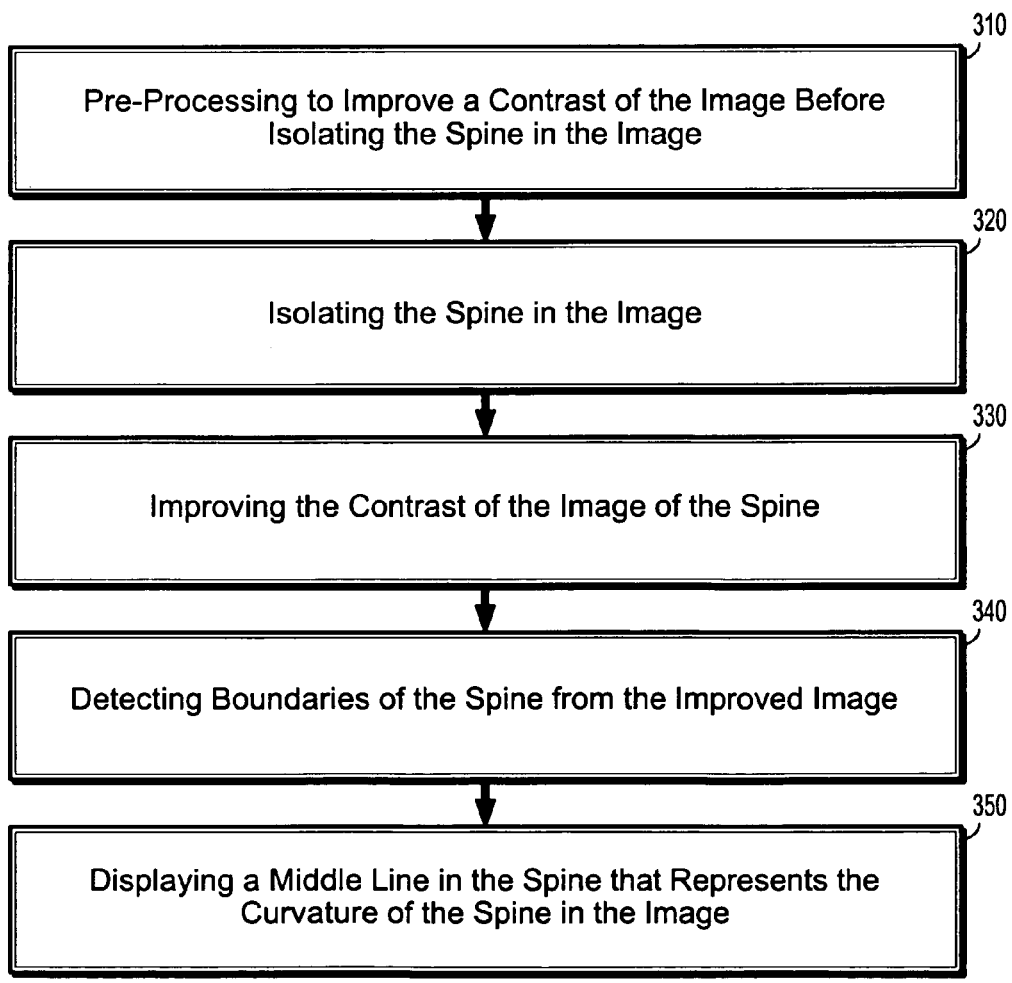
FIG. 3 is a flowchart showing a method for automatically displaying the curvature of the spine as a line in the image of the spine, according to an exemplary embodiment of the present invention.

In step 220, the curvature of the spine is automatically displayed as a line in an image of the spine. FIG. 3 is a flowchart showing a method for automatically displaying the curvature of the spine as a line in the image of the spine, according to an exemplary embodiment of the present invention. Referring to FIG. 3, in an optional step 310, the image is pre-processed to improve a contrast of the image.

In step 320, the spine is isolated in the image. When the image is a first view of the spine, isolating the spine in the first view of the spine may comprise determining a top cut point and a bottom cut point, wherein the top cut point corresponds to the beginning of the spine and the bottom cut point corresponds to the bottom of the spine. The step of determining the top cut point may comprise detecting a head in the first view of the image. In an exemplary embodiment of the present invention, detecting the head in the first view of the spine comprises equalizing a histogram, thresholding and segmenting the head.

Figure 5A:
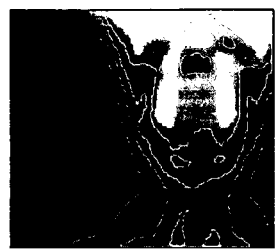
FIG. 5A through 5C illustrate steps to detect the top cut point, according to an exemplary embodiment of the present invention.
Figure 5B:
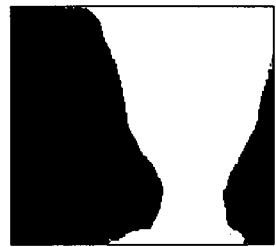
Figure 5C:
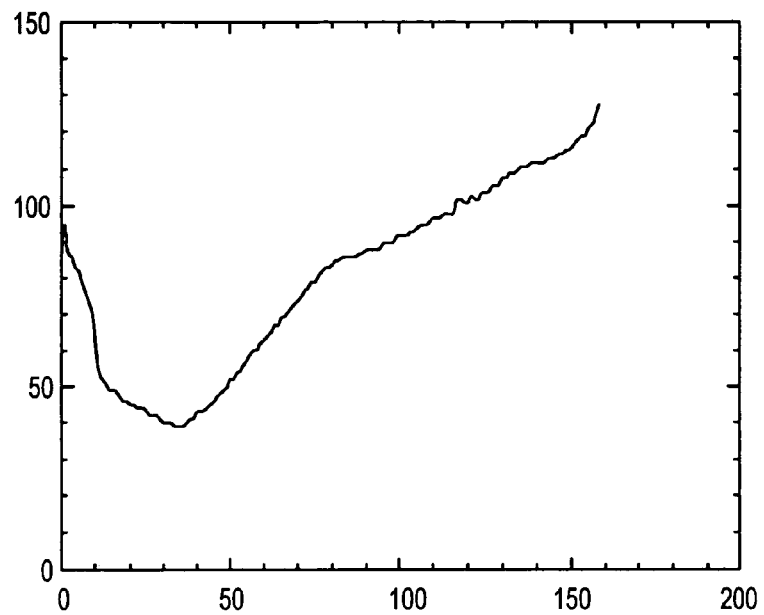

FIGS. 5A through 5C illustrate a method for detecting the top cut point, according to an exemplary embodiment of the present invention. First, the histogram is equalized. For example, as shown in FIG. 5A, the histogram may be limited to five grey levels to simplify the image. With a threshold at, for example, half of the new histogram, as shown in FIG. 5B, the head can be segmented. Referring to FIG. 5C, the sum of head pixels for each row of this image yields a curve, in which the minimum corresponds to the bottom of the head. Based on the location of the bottom of the head, the beginning of the spine can be detected, which becomes the top cut point.

The step of determining the bottom cut point may comprise detecting a pelvis in the first view of the image. The bottom cut point may be determined by the same method used for determining the top cut point.

Figure 6:
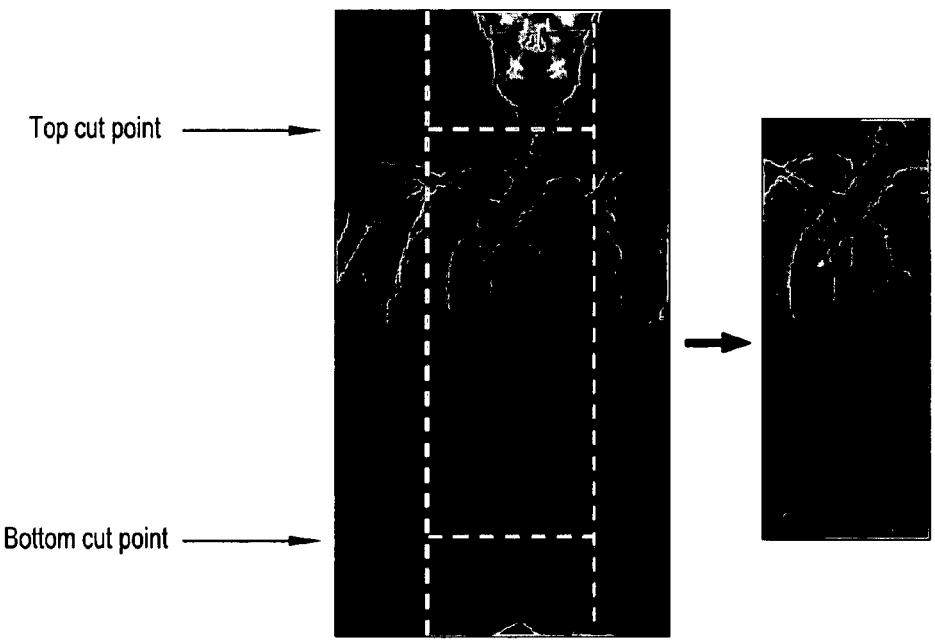
FIG. 6 illustrates a coronal image and pre-selection of the spine, according to an exemplary embodiment of the present invention.

FIG. 6 shows a coronal view of the spine and illustrates pre-selection of the spine, according to an exemplary embodiment of the present invention. Referring to FIG. 6, a portion of each side of the original image is removed, and the head and pelvis are removed. For example, if the spine is approximately located in the middle of the image, a quarter of the image on each side of the image may be removed. The head and pelvis may be removed by cutting the original image at the top and bottom cut points, respectively. Pre-selection of the spine results in an image with smaller dimensions than the original image and that shows primarily the spine. In the case of a lateral view of the spine, pre-selection includes removal of the pelvis, but the head may not be removed.

In step 330, the contrast of the image of the spine is improved. In an exemplary embodiment of the present invention, improving the contrast of the image of the spine comprises generating a mask of the spine and improving the contrast of vertebrae of the spine. FIG. 7 illustrates improving the contrast of vertebrae of the spine, according to an exemplary embodiment of the present invention. Generating a mask of the spine may comprise finding a region of interest and generating a mask to enable removal of artifacts.

In an exemplary embodiment of the present invention, finding a region of interest includes dividing the image into a plurality of slices, such that the width of each slice is equal to the width of the image, and the height of each slice is a predetermined number of times smaller than the height of the image. For example, divide the image into slices that have the same width as the image and a height that is 20 times smaller than the image height. For each slice, equalize the histogram to spread the intensity distribution and apply a threshold of a predetermined percentage of a maximum intensity to improve the contrast. For example, for each slice, equalize the histogram to spread the intensity distribution and apply a threshold of seventy-five percent of the maximum intensity to improve the contrast, as shown in FIG. 7. Shift each of the slices by one tenth of the height of the slice; and repeating the steps of dividing, equalizing and shifting a predetermined number of times to obtain a set of results. Take the mean of the set of results.

When the image is a coronal view of the spine, generating the mask may comprise: generating a binary representation of the image; applying a morphological closing to fill gaps with a small round structuring element in the binary representation of the image; and doing a region labeling and selecting a region of interest in the binary representation of the image. Constraints in the width of the mask may be applied to improve the mask.

FIGS. 6A through 6E illustrate the generation of the mask of the spine for coronal images, according to an exemplary embodiment of the present invention. For example, a mask of the spine can be generated to enable removal of substantially all artifacts from the ribs. The following steps may be used for coronal images of the spine. First, find the region of interest: Divide the image into slices, for example, having the same width as the image and a height that is twenty times smaller than the image height. For each slice, equalize the histogram to spread the intensity distribution and apply a threshold of, for example, seventy-five percent of the maximum intensity to improve the contrast. Second, generate a mask: Generate a binary of the image, for example, each non-black pixel becomes true, false elsewhere, as shown in FIG. 8A. Apply a morphological closing (dilation+erosion) to fill the gaps with a small round structuring element, as shown in FIG. 8B.

$$D(A, B) = A \oplus B = \bigcup_{\beta \in B} (A + \beta)$$

$$E(A, B) = A \ominus (-B) = \bigcap_{\beta \in B} (A - \beta)$$

Do a region labeling and select the region of interest as shown in FIG. 8C. Dilate as shown in FIG. 8D. Apply constraints in the width of the mask to improve the mask as shown in FIG. 8E. Fill the black parts (width equal to 0). Remove the holes (width smaller than the average width). Remove the bumps (width larger than the average width).

FIGS. 9A through 9C illustrate the generation of the mask of the spine for lateral images, according to an exemplary embodiment of the present invention. When the image is a lateral view of the spine, generating the mask may comprise: generating a binary representation of the image; doing a region labeling and selecting a region of interest in the binary representation of the image; separately extracting a right boundary and a left boundary of the region as vectors; selecting the smoothest curve; and drawing a mask following the curve and adding a predetermined value representing a width of the spine.

Referring to FIGS. 9A through 9C, for lateral images: Generate a binary representation of the image. Do region labeling, and select the region of interest as shown in FIG. 9A. Extract the right and the left boundaries of the region separately as vectors. Select the smoothest curve and use it to represent the back, as shown in FIG. 9B. Draw a mask following the curve and adding the width of the spine, which may be arbitrarily defined, as shown in FIG. 9C.

Having isolated the spine, it is easier to improve the contrast of the vertebrae. Extract a section on the bottom of the image. For each section, apply histogram equalization and stretching. For example, if an image has a range of grey level between $g_1$ and $g_2$, it is possible to increase the contrast by using a larger range of values: from 0 to 255. Letting x=original grey-level scale of the image, and y=resulted grey-level scale, the transformation can be expressed as follows: $y=255 \times (x-g_i)/(g_2-g_i)$.

In each section, extract the resulting middle line and shift the band of one line above. This technique works on the histogram locally in the image and may result in improved contrast.

In step 340, boundaries of the spine are detected from the improved image. In an exemplary embodiment of the present invention, detecting boundaries of the spine from the improved image comprises: applying a threshold to the contrast-enhanced image; doing a region labeling of the binary image and selecting the spine; along each row of the spine region, storing the minimum and maximum x-coordinates in two right and left vectors; and smoothing the two vectors with the minimum and maximum x-coordinates using a smoothing window of a predetermined height. For example, the predetermined height may be a tenth of the image height. In step 350, a middle line is displayed in the spine that represents the curvature of the spine in the image.

FIGS. 10A through 10C show displays of the curvature of the spine, according to an exemplary embodiment of the present invention. Detect the boundaries of the spine from the improved image by generating a binary of the image followed by a region labeling and extraction of the region of interest, as shown in FIG. 10A. Then, extract the right and the left boundaries separately as vectors (vecRight and vecLeft) as shown in FIG. 10B. Smooth these two vectors with a large width (a tenth of the height of the image). The smooth array R of a vector A can be expressed as follows.

$$R_i = \begin{cases} \frac{1}{w}\sum_{j=0}^{w-1} A_{i+j-w/2}, & i = w/2, \ldots, N-w \\ A_i, & \text{otherwise} \end{cases}$$

where N=number of elements in A, W=width of the smooth operation.

Extract the mean line of these two vectors. For each row i of the image: vecCurve(i)=[vecRight(i)+vecLeft(i)]/2. By converting this resulting vector (vecCurve) into a line in the image, a representation of the curve of the spine is obtained as shown in FIG. 10C. FIGS. 12A and 12B illustrate curves of the spine and Cobb angle in a coronal image and a lateral image, respectively, according to exemplary embodiments of the present invention.

Referring to FIG. 2, in step 230, the first angle or the second angle is computed based on the line of the curvature of the spine. For example, the first angle may be the Cobb angle that is computed for coronal images, and the second angle may be the kyphotic angle that is computed for lateral images.

Figure 1:
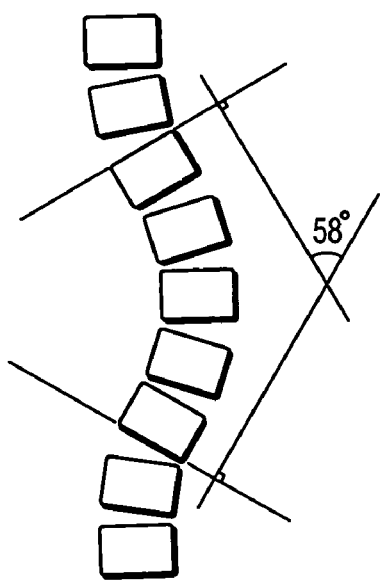
FIG. 1 illustrates the hand calculation of the Cobb angle in a coronal view of the spine.
Figure 4:
FIG. 4 shows a display of the curve and the Cobb angle in a coronal view of an X-ray image of the spine, according to an exemplary embodiment of the present invention.

FIG. 4 shows a display of the curve and the Cobb angle in a coronal view of an X-ray image of the spine, according to an exemplary embodiment of the present invention. The Cobb angle may be computed as the sum of the two largest angles between the curve of the spine and horizontal line as shown in FIG. 4.

In an exemplary embodiment of the present invention, the first angle is the Cobb angle, and computing the Cobb angle based on the curvature of the spine comprises: determining the global curve of the spine; finding the maximum positive and negative angles from the curve by calculating an angle at each point of the curve; and computing the Cobb angle by summing the absolute value of the most negative and positive angles of the curve. Calculating the angle at each point of the curve may comprise: computing the angle using a tangent of the curve at the specified point and a horizontal line; locally applying a Gabor filtering along the direction set by the computed angle; estimating an orientation from endplates of the vertebrae based on the Gabor filtering; and setting the orientation as the Cobb angle. FIG. 13 illustrates edge detection with Gabor filter of two vertebrae of interest in a coronal image, according to an exemplary embodiment of the present invention.

In an exemplary embodiment of the present invention, the second angle is the kyphotic angle, and computing the kyphotic angle based on the curvature of the spine comprises: determining a global curve of the spine; finding the maximum positive and negative angles from the curve by calculating an angle at each point of the curve; and computing the kyphotic angle by summing the absolute value of the most negative and positive angles of the curve. Calculating an angle at each point of the curve may comprise: computing the angle using a tangent of the curve at the specified point and a horizontal line; locally applying a Gabor filtering along the direction set by the computed angle; estimating an orientation from endplates of the vertebrae based on the Gabor filtering; and setting the orientation as the kyphotic angle.

To calculate the first or second angle (e.g., Cobb or kyphotic), two angles are needed: the positive and the negative angles which tilt the most. FIG. 9 illustrates a calculation of the angle of a point in a curve, according to an exemplary embodiment of the present invention. For each point i of the curve, calculate the angle ($\alpha$) between the tangent and the horizontal line. Then, separate the positive angles ($\alpha_p$) from the negative ones ($\alpha_N$). Determine the two maximum values and the sum of these values gives the specific angle: Specific angle=max ($\alpha_p$)+|max ($\alpha_N$)|

Figure 14:
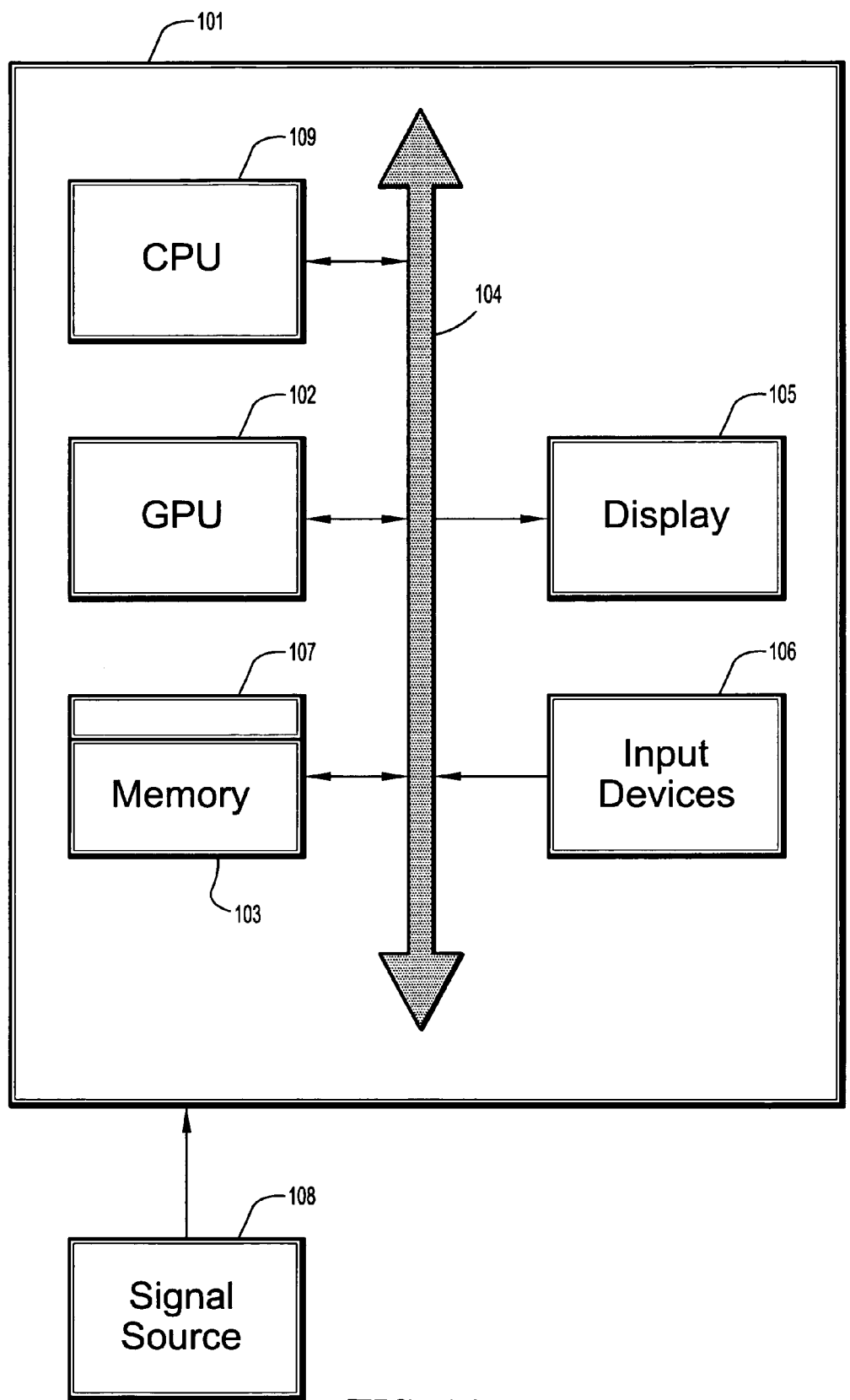
FIG. 14 illustrates a computer system for implementing a method for automatic detection of curvature of a spine and computation of specific angles in images of the spine, according to an exemplary embodiment of the present invention.

FIG. 14 illustrates a computer system for implementing a method for automatic detection of curvature of a spine and computation of specific angles in images of the spine, according to an exemplary embodiment of the present invention. Examples of images include X-ray images, positron emission tomography (PET) images, computed tomography (CT) images, magnetic resonance imaging (MRI) images, single-photon emission computed tomography (SPECT) images, etc.

Referring to FIG. 14, a computer system 101 for implementing a method of automatic detection of curvature of a spine and computation of specific angles in images of the spine can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

In an exemplary embodiment of the present invention, a system for providing automatic detection of curvature of a spine and computation of specific angles in images of the spine comprises a memory device (103) for storing a program, and a processor (109) in communication with the memory device (103). The processor (109) is operative with the program to automatically display the curvature of the spine as a line in an image of the spine, and compute at least one of a first angle or a second angle based on the line of the curvature of the spine. The processor (109) may be further operative with the program code to automatically detect whether the image is a lateral view of the spine or a coronal image of the spine.

The processor (109) may be operative with the program code to: isolate the spine in the image; improve the contrast of the image of the spine; detect boundaries of the spine from the improved image; and display a middle line in the spine that represents the curvature of the spine in the image.

The processor (109) may be operative with the program code to: divide the image into a plurality of slices or sections, wherein a width of each slice or section is equal to a width of the image, and wherein a height of each slice or section is a predetermined number of times smaller than a height of the image; for each slice or section, equalize a histogram to spread the intensity distribution and apply a threshold of a predetermined percentage of a maximum intensity to raise a contrast; shift each of the slices by one tenth of the height of the slice; and repeat the steps of dividing, equalizing and shifting a predetermined number of times to obtain a set of results; and calculate a mean of the set of results.

The processor (109) may be operative with the program code to: generate a binary representation of the image; do a region labeling and select a region of interest in the binary representation of the image; separately extract a right boundary and a left boundary of the region as vectors; select the smoothest curve; and draw a mask following the curve and add a predetermined value representing a width of the spine.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 15:
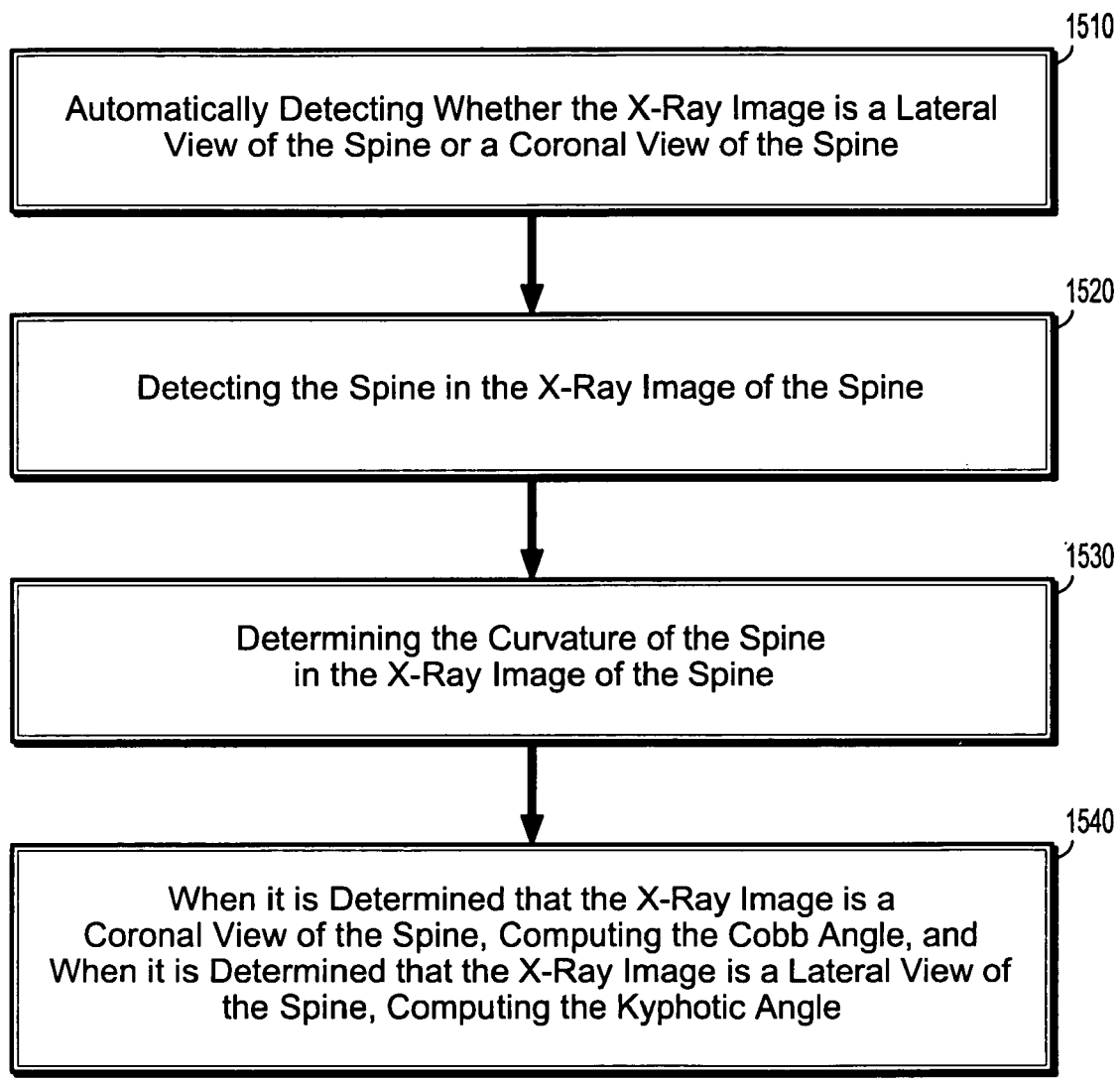
FIG. 15 is a flowchart showing a method for providing automatic detection of curvature of a spine and computation of one of a Cobb angle or a kyphotic angle in an X-ray image of the spine, according to an exemplary embodiment of the present invention.

FIG. 15 is a flowchart showing a method for providing automatic detection of curvature of a spine and computation of one of a Cobb angle or a kyphotic angle in an X-ray image of the spine, according to an exemplary embodiment of the present invention.

Referring to FIG. 15, in step 1510, automatically detecting whether the X-ray image is a lateral view of the spine or a coronal view of the spine. In step 1520, the spine is detected in the X-ray image of the spine. In step 1530, the curvature of the spine is determined in the X-ray image of the spine. In step 1540, when it is determined that the X-ray image is a coronal view of the spine, the Cobb angle is computed, and when it is determined that the X-ray image is a lateral view of the spine, the kyphotic angle is computed.

Although exemplary embodiments of the present invention have been described in detail with reference to the accompanying drawings for the purpose of illustration, it is to be understood that the inventive processes and systems are not to be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. A method, comprising:
automatically displaying curvature of a spine as a line in an image of the spine; wherein automatically displaying the curvature of the spine comprises:

improving contrast of the image of the spine by generating a mask of the spine and improving the contrast of vertebrae of the spine, wherein generating a mask of the spine comprises finding a region of interest, wherein finding a region of interest comprises:

dividing the image into a plurality of slices, wherein a width of each slice is equal to a width of the image; and a height of each slice is a predetermined number of times smaller than a height of the image;

for each slice, equalizing a histogram to spread the intensity distribution and applying a threshold of a predetermined percentage of a maximum intensity to raise the contrast;

shifting each of the slices by one tenth of the height of the slice;

repeating the steps of dividing, equalizing and shifting a predetermined number of times, obtaining a set of results; and calculating a mean of the set of results.

2. The method of claim 1, further comprising:
computing at least one of a first angle or a second angle based on the line of the curvature of the spine, wherein the first angle is a Cobb angle and the second angle is a kyphotic angle.

3. The method of claim 1, further comprising automatically detecting whether the image is a first view or a second view of the spine.

4. The method of claim 3, wherein the first view is lateral view of the spine and the second view is a coronal image of the spine.

5. The method of claim 1, wherein automatically displaying the curvature of the spine as a line in the image of the-spine further comprises:
isolating the spine in the image;
detecting boundaries of the spine from the improved image; and
displaying a middle line in the spine that represents the curvature of the spine in the image.

6. The method of claim 5, wherein the image is a first view of the spine, and wherein isolating the spine in the first view of the spine comprises:
determining a top cut point, the top cut point corresponding to the beginning of the spine; and
determining a bottom cut point, the bottom cut point corresponding to the bottom of the spine.

7. The method of claim 6, wherein determining the top cut point comprises detecting a head in the first view of the image.

8. The method of claim 7, wherein detecting the head in the first view of the image comprises equalizing a histogram, thresholding and segmenting the head.

9. The method of claim 6, wherein determining the bottom cut point comprises detecting a pelvis in the first view of the image.

10. The method of claim 6, wherein the first view of the image is one of a lateral view of the spine or a coronal view of the spine.

11. The method of claim 6, further comprising removing a portion of each side of the image.

12. The method of claim 5, wherein generating a mask of the spine further comprises generating a mask to enable removal of artifacts.

13. The method of claim 12, wherein, when the image is a coronal view of the spine, generating the mask comprises:
generating a binary representation of the image;
applying a morphological closing to fill gaps with a small round structuring element in the binary representation of the image; and
doing a region labeling and selecting a region of interest in the binary representation of the image.

14. The method of claim 13, further comprising applying constraints in the width of the mask to improve the mask.

15. The method of claim 12, wherein, when the image is a lateral view of the spine, generating the mask comprises:
generating a binary representation of the image;
doing a region labeling and selecting a region of interest in the binary representation of the image;
separately extracting a right boundary and a left boundary of the region as vectors;
selecting the smoothest curve; and
drawing a mask following the curve and adding a predetermined value representing a width of the spine.

16. The method of claim 5, further comprising pre-processing to improve a contrast of the image before isolating the spine in the image.

17. A method, comprising:
automatically displaying curvature of a spine as a line in an image of the spine, wherein automatically displaying the curvature of the spine comprises:
improving contrast of the image of the spine;
detecting boundaries of the spine from the improved image; wherein detecting boundaries of the spine from the improved image comprises:
applying a threshold to the contrast-enhanced image;
doing a region labeling of a binary representation of the contrast-enhanced image and selecting the spine;
along each row of the spine region, storing a minimum and maximum x-coordinates in two right and left vectors: and
smoothing the two vectors with the minimum and maximum x-coordinates using a smoothing window of a predetermined height, wherein the predetermined height is tenth of the image height.

18. The method of claim 5, wherein displaying a middle line in the spine that represents the curvature of the spine in the X-ray image comprises:
obtaining a middle point for each line of the spine region by computing the middle value between pre-computed left and right vectors; and
joining all the pre computed middle points to form the representation of the curve of the spine.

19. The method of claim 1, further comprising:
computing a Cobb angle based on the line of the curvature of the spine, wherein computing the Cobb angle based on the curvature of the spine comprises:
determining the global curve of the spine;
finding the maximum positive and negative angles from the curve by calculating an angle at each point of the curve; and
computing the Cobb angle by summing the absolute value of the most negative and positive angles of the curve.

20. The method of claim 19, wherein calculating an angle at each point of the curve comprises:
computing the angle using a tangent of the curve at the specified point and a horizontal line;
locally applying a Gabor filtering along the direction set by the computed angle;
estimating an orientation from endplates of the vertebrae based on the Gabor filtering; and
setting the orientation as the Cobb angle.

21. The method of claim 1, further comprising:
computing a kyphotic angle based on the line of the curvature of the spine, wherein computing the kyphotic angle based on the curvature of the spine comprises:
determining a global curve of the spine;

finding the maximum positive and negative angles from the curve by calculating an angle at each point of the curve; and computing the kyphotic angle by summing the absolute value of the most negative and positive angles of the curve.

22. The method of claim 21, wherein calculating an angle at each point of the curve comprises:

computing the angle using a tangent of the curve at the specified point and a horizontal line;

locally applying a Gabor filtering along the direction set by the computed angle;

estimating an orientation from endplates of the vertebrae based on the Gabor filtering; and setting the orientation as the kyphotic angle.

23. A system comprising:

a memory device for storing a program;

a processor in communication with the memory device, the processor operative with the program to:

automatically display curvature of a spine as a line in an image of the spine;

divide the image into a plurality of slices, wherein a width of each slice is equal to a width of the image, and wherein a height of each slice is a predetermined number of times smaller than a height of the image;

for each slice, equalize a histogram to spread the intensity distribution and apply a threshold of a predetermined percentage of a maximum intensity to raise the contrast;

shift each of the slices by one tenth of the height of the part;

repeat the steps of dividing, equalizing and shifting a predetermined number of times to obtain a set of results; and calculate a mean of the set of results.

24. The system of claim 23, wherein the processor is further operative with the program to:

isolate the spine in the image;

improve the contrast of the image of the spine;

detect boundaries of the spine from the improved image; and display a middle line in the spine that represents the curvature of the spine in the image.

25. The system of claim 23, wherein the processor is further operative with the program to automatically detect whether the image is a lateral view of the spine or a coronal image of the spine.

26. The system of claim 23, wherein the processor is further operative with the program to:

generate a binary representation of the image;

do a region labeling and select a region of interest in the binary representation of the image;

separately extract a right boundary and a left boundary of the region as vectors; select the smoothest curve; and draw a mask following the curve and add a predetermined value representing a width of the spine.

27. The system of claim 23, wherein the processor is further operative with the program to:

compute at least one of a first angle or a second angle based on the line of the curvature of the spine.

* * * * *